United States Patent [19]

Kerawalla

[11] 3,977,172

[45] Aug. 31, 1976

[54] REINFORCEMENT CORD

[75] Inventor: Jal N. Kerawalla, Greenville, N.C.

[73] Assignee: E. I. Du Pont de Nemours and Company, Wilmington, Del.

[22] Filed: Feb. 6, 1975

[21] Appl. No.: 547,467

[52] U.S. Cl. .............................. 57/140 BY
[51] Int. Cl.² ................... D02G 3/04; D02G 3/26; D02G 3/48
[58] Field of Search ............... 57/140 BY; 260/78 S

[56] References Cited
UNITED STATES PATENTS

| | | | |
|---|---|---|---|
| 2,755,214 | 7/1956 | Lyons et al. | 57/140 BY X |
| 3,422,873 | 1/1969 | Liska | 57/140 BY X |
| 3,429,117 | 2/1969 | Sherer | 57/140 BY |
| 3,869,429 | 3/1975 | Blades | 260/78 S |
| 3,869,430 | 3/1975 | Blades | 260/78 S |

Primary Examiner—Herbert Goldstein
Assistant Examiner—Charles Gorenstein

[57] ABSTRACT

A cord useful for mechanical rubber goods, e.g. tires, V-belts, conveyor belts, composed of twisted plies of poly(p-phenyleneterephthalamide) continuous filaments and nylon or polyester continuous filaments.

3 Claims, No Drawings

REINFORCEMENT CORD

BACKGROUND OF THE INVENTION

A low thermal shrinkage and high modulus fiber is desired in belts or carcasses of radial tires but may cause some problems in bias type tire constructions. A small amount of shrinkage is necessary to no-reset performance in V-belts and prevents "wavy fabric" under belts of radial carcasses. Reasonable modulus gives more flexibility in tire building and gives better load distribution and better fatigue resistance in bias tires. Combining two different types of yarn in forming a tire cord has been shown in previous work to give properties between those of similar cords made from the individual fibers, for example, F. J. Kovak et al. "Merged Fibers: Tailored Textiles for Tires" presented at the 1965 Spring meeting of the American Chemical Society Rubber Division in Miami Beach, Fla.

DESCRIPTION OF THE INVENTION

The present invention is an improved cord for mechanical rubber goods, comprising one or two ends (also referred to as plies) of continuous filament poly(p-phenylene-terephthalamide) (hereinafter PPD-T) yarn, and one end of continuous filament nylon or polyester (e.g., polyethylene-terephthalate) yarn, each end having a denier of between 500 and 3000, said cord having a twist multiplier within the range of about 6 to 10.

DETAILED DESCRIPTION OF THE INVENTION

In accordance with the present invention, the cord is formed by cabling together twisted yarns of continuous filament PPD-T and twisted yarns of either continuous filament nylon or polyester. The PPD-T yarn is employed in a ratio of one or two ends for each end of nylon or polyester yarn. It is preferred that each of the ends of twisted yarn have a denier within the range of 500 to 3000. As is well known in the art, the ends should be approximately equal in size in order to obtain a balanced cord. Each of the plies is twisted in the same direction and the combined ends are twisted approximately the same amount in the opposite direction to give a twist multiplier in the range of between 6 and 10. It has been found that the cabled yarn has a far lower disc fatigue loss than would be expected from the components which make up the cabled yarn. In addition, the cabled yarn exhibits a modest shrinkage adequate to prevent wavy cord and loose bead turn-ups in bias type tires.

TEST PROCEDURES

Disc Fatigue Test

Cords are cured in rubber (a carcass type rubber stock) blocks which are mounted into the periphery of two circular discs which are canted with respect to each other. When the discs revolve, the cord-containing blocks are alternately compressed and extended. The apparatus used for this test is similar to that described in U.S. Pat. No. 2,595,069. The blocks are flexed for a specified period. The cords are then removed from the blocks by dissolving away the rubber and tested for tensile strength on an Instron Tensile Tester. The strength is then compared to that of controls (cords that were cured into blocks but not flexed). The difference is expressed as % loss. In the following examples the flex time was about 11.5 hrs.

Cord Properties

The cord properties were measured by A.S.T.M. test number D-885. Shrinkage was measured after exposure at 160°C. for 15 minutes.

Twist Multiplier

Twist Multiplier (T.M.) for the purposes of the present application is calculated from the following formula:

$$TM = 0.0137 \, tpi \, \sqrt{denier}$$

wherein
tpi = turns per inch in the twisted cord and
denier = denier of twisted cord

EXAMPLE I

A tire cord (A) was prepared from three ends (1500 denier each) of PPD-T yarn. A second tire cord (B) was prepared from two ends of PPD-T yarn (1500 denier each) and one end of nylon yard (1260 denier). The cords were made, dipped, cured in rubber blocks and examined for disc fatigue. In the flex cycle, the blocks were given 6% extension and 2% compression. The details of the cord construction and the properties of the cords are presented in Table I below. It will be seen from the Table that cord (B) exhibits a disc fatigue loss that is significantly less than that of cord (A).

TABLE I

| Cord | A | B |
|---|---|---|
| Twist, ply × cord | 8.8 × 8.8 | 8.8 × 8.8 |
| Dipped cord* | | |
| Tenacity — gpd | 18.3 | 13.6 |
| Break elongation — % | 6.7 | 7.5 |
| Modulus — gpd | 221 | 137 |
| Shrinkage — % | 0.14 growth | 1.24 |
| Denier** | 4829 | 4621 |
| Disc Fatigue | | |
| Control Break Strength (lbs) | 188.3 | 133.9 |
| Fatigued Break Strength (lbs) | 165.3 | 130.5 |
| % Loss | 12.2 | 2.6 |
| Twist multiplier | 8.4 | 8.2 |

*Dipped in epoxy adhesive, dried and treated at 475°F for one minute at 7 lbs. tension and then dipped in resorcinol-formaldehyde latex, dried and treated at 475°F for one minute at 2 lbs. tension.
**Corrected for dip pick-up.

Four-ply bias passenger tires (7.75×14) were made from similar tire cord containing 2 plies of PPD-T and 1 ply of nylon. These tires were tested according to the DOT (Department of Transportation) plunger energy test (No. 109) except that inflation pressure was 32 psi and inner tubes were in the tires. Plunger energy of the 2 PPD-T/1 nylon cord at 6.2 twist multiplier was 4033 inch-lbs. compared to 5438 inch-lbs. for a 3 ply PPD-T cord at 6.3 twist multiplier. Both values exceed the DOT minimum of 2600 inch-lbs.

EXAMPLE II

A tire cord (C) was prepared from three ends of PPD-T yarn. A second tire cord (D) was prepared from two ends of PPD-T yarn and one end of nylon yarn, and a third tire cord (E) was prepared from two ends of PPD-T yarn and one end of polyester (polyethyleneterephthalate) yarn. The cords were made, dipped, cured in rubber blocks and examined for disc fatigue. In the flex cycle, the blocks were given 10% extension and 8% compression. The details of the cord construction and the properties of the cords are presented in Table II below. It will be seen from the Table that cords (D) and (E) show a disc fatigue loss that is much lower than that of cord (C).

TABLE II

| Cord | (C) | (D) | (E) |
|---|---|---|---|
| Twist, ply × cord | 7.4 × 7.0 | 7.3 × 7.1 | 7.1 × 7.2 |
| Dipped cord* denier | 4766 | 4516 | 4603 |
| Tenacity - gpd | 19.4 | 15.4 | 15.1 |
| Break elongation - % | 5.2 | 6.3 | 7.1 |
| Modulus - gpd | 349 | 198 | 164 |
| Shrinkage - % | 0.2 growth | 1.3 | 1.3 |
| Disc fatigue (% loss) | 49 | 37 | 41 |
| Twist multiplier | 6.6 | 6.5 | 6.7 |

*Dipped in epoxy adhesive, dried and treated at 425°F for one minute at one gpd tension and then dipped in resorcinol-formaldehyde latex, dried and treated at 425°F for one minute at 0.3 gpd tension. Corrected value given.

EXAMPLE III

A tire cord (F) was prepared from two ends of PPD-T yarn. A second tire cord (G) was prepared from one end of PPD-T yarn and one end of nylon yarn, and a third cord (H) was prepared from one end of PPD-T yarn and one end of polyester (polyethyleneterephthalate) yarn. The cords were made, dipped, cured in rubber blocks and examined for disc fatigue (same flex cycle as in Example II). The details of the cord construction and the properties of the cords are presented in Table III below. It will be seen from the Table that cords (G) and (H) show a disc fatigue loss that is much lower than that of cord (F).

TABLE III

| Cord | (F) | (G) | (H) |
|---|---|---|---|
| Twist, ply × cord | 8.5 × 8.5 | 9.1 × 9.2 | 8.8 × 8.9 |
| Dipped cord* denier | 3137 | 3014 | 2964 |
| Tenacity - gpd | 18.8 | 12.7 | 13.0 |
| Break elongation - % | 4.8 | 11.0 | 7.4 |
| Modulus - gpd | 362 | 52 | 161 |
| Shrinkage - % | 0.07 | 1.7 | 2.5 |
| Disc Fatigue (% loss) | 62 | 42 | 44 |
| Twist multiplier | 6.5 | 6.9 | 6.6 |

*Dipped in epoxy adhesive, dried and treated at 425°F for one minute at 1 gpd tension and then dipped in resorcinol-formaldehyde latex, dried and treated at 425°F for one minute at 0.3 gpd tension. Corrected value given.

What is claimed is:

1. A cord for reinforcement of mechanical rubber goods comprising a cabled yarn of one or two ends of poly(p-phenyleneterephthalamide) continuous filament yarn and one end of nylon or polyester continuous filament yarn, each end having a denier between 500 and 3000, the ends being approximately equal in size and twisted in the same direction, the combined ends being twisted approximately the same amount in the opposite direction to form a cabled yarn having a twist multiplier of between about 6 and 10.

2. The cord of claim 1 wherein the poly(p-phenyleneterephthalamide) continuous filament yarn is cabled with one end of continuous filament nylon yarn.

3. The cord of claim 1 wherein the poly(p-phenyleneterephthalamide) continuous filament yarn is cabled with one end of continuous filament polyester yarn.

* * * * *